US008923330B2

(12) United States Patent
Krzanowski et al.

(10) Patent No.: US 8,923,330 B2
(45) Date of Patent: Dec. 30, 2014

(54) USING DYNAMIC BURST SIZE METRIC TO MARK DATA

(75) Inventors: Roman Krzanowski, White Plains, NY (US); Charles Thomas Wilkes, Londonderry, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 984 days.

(21) Appl. No.: 13/019,362

(22) Filed: Feb. 2, 2011

(65) Prior Publication Data

US 2012/0195326 A1 Aug. 2, 2012

(51) Int. Cl.
*H04J 3/16* (2006.01)
*H04L 12/923* (2013.01)
*H04L 12/413* (2006.01)

(52) U.S. Cl.
CPC ............. *H04L 47/762* (2013.01); *H04L 12/413* (2013.01)
USPC ....................................................... 370/468

(58) Field of Classification Search
USPC .................................................. 370/229–240
See application file for complete search history.

(56) References Cited

U.S. PATENT DOCUMENTS

| 6,611,503 | B1* | 8/2003 | Fitzgerald et al. ............ 370/260 |
| 2009/0122698 | A1* | 5/2009 | Lakshmikantha et al. .... 370/229 |
| 2009/0225759 | A1* | 9/2009 | Hussain et al. ............ 370/395.1 |
| 2010/0316221 | A1* | 12/2010 | Tie et al. ....................... 380/270 |
| 2013/0088957 | A1* | 4/2013 | Bugenhagen ................. 370/230 |

* cited by examiner

*Primary Examiner* — Jung-Jen Liu

(57) ABSTRACT

A device may receive first data at a channel over a network, the device having an interface for the channel and other channels. In addition, the device may measure over a particular time interval, a burst size and an information arrival rate at the channel based on received data. The device may also determine whether the burst size is greater than a first burst size metric, the first burst size metric initialized to a committed burst size of the channel. When the burst size is determined to be greater than the first burst size metric, the device may set a second burst size metric to a sum of the first burst size metric and an increment value. Furthermore, the device may determine whether the burst size is greater than the second burst size metric after the second burst size metric is set to the sum of the first burst size metric and the increment value. The device may also increase a first amount, of a resource allocated to the channel of the network device, by an increment corresponding to the second burst size metric after determining that the burst size is not greater than the second burst size metric. The device may decrease a second amount, of the resource allocated to the other channels, by the increment, when the first amount of the resource is increased by the increment.

20 Claims, 9 Drawing Sheets

USING DYNAMIC BURST SIZE METRIC TO MARK DATA

BACKGROUND INFORMATION

In recent years, carrier-class Ethernet has emerged as a significant technology with respect to transport of traffic over Metro Area Networks (MANs). For example, in the United States, the demand for Ethernet services is expected to increase at a compound annual growth rate (CAGR) of over 20%. The demand is projected to exceed $5 billion by 2012. Such growth and increasing demand are partly driven by the need for higher bandwidth for site-to-site and data center connectivity, scalability, performance, and security.

DETAILED DESCRIPTION OF PREFERRED EMBODIMENTS

The following detailed description refers to the accompanying drawings. The same reference numbers in different drawings may identify the same or similar elements. As used herein, the term "committed information rate (CIR)" refers to an information rate that an element in a network has contracted with other elements in the network. CIR may reflect a long-term average information rate that a channel can sustain. As used herein, the term "committed burst size (CBS)" refers to the maximum amount of information that a network element has contracted with other network elements to process, over a monitoring interval (MI). CBS may limit the amount of data that can be transmitted in a given interval (i.e., burst or back-to-back transmission). Generally, given a channel, MI≤CBS/CIR.

As described below, a network element may use a burst size metric (BSM) to mark incoming data as red or green (e.g., way of classifying data) and to process the marked data. In addition, depending on the implementation, the network element may reallocate system resources (e.g., processing cycles, buffer, etc.) and/or improve its processing performance based on the B and T, set alarms, enable or disable processing data, etc.

Figure 1A:
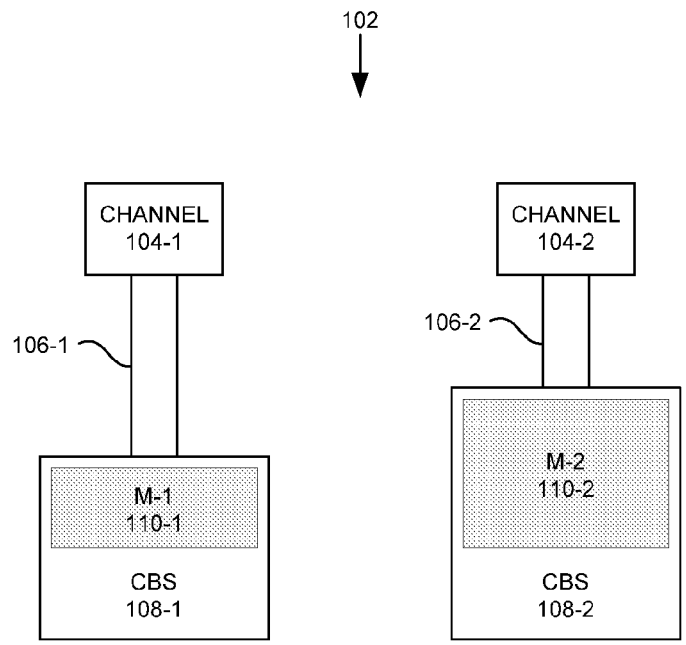
FIGS. 1A and 1B illustrate concepts described herein.
Figure 1B:
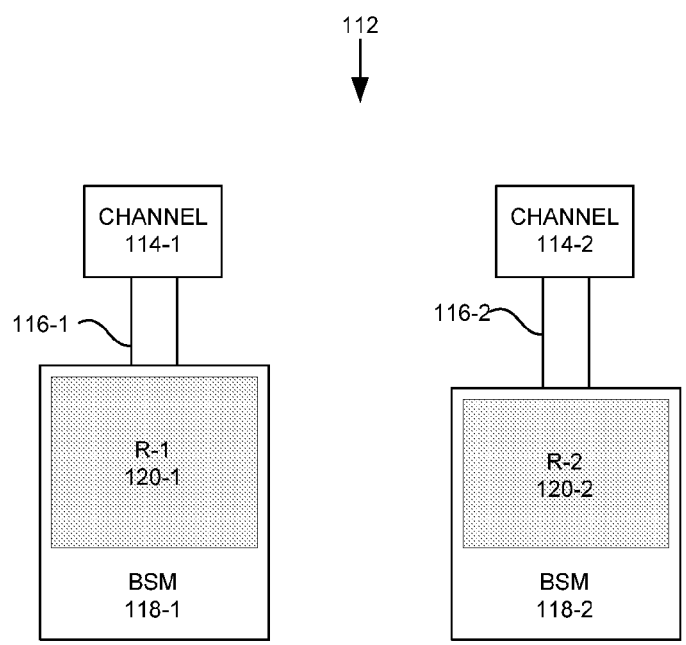

FIGS. 1A and 1B illustrate the concepts described herein. FIG. 1A shows a communication system 102 that processes network traffic based on CBS and CIR. As shown in FIG. 1A, communication system 102 in a device provides channels 104-1 and 104-2 (collectively channels 104) through which system 102 receives incoming network traffic. For channel 104-1, the incoming network traffic is associated with two parameters, a CIR 106-1 and a CBS 108-1. Based on CIR 106-1 and CBS 108-1, system 102 may allocate resource M-1 and process the traffic (e.g., drop a frame). Channel 104-2 is associated with similar parameters CIR 106-2 and CBS 108-2. System 102 may allocate resource M-2 110-2 and process the network traffic based pm CIR 106-2 and CBS 108-2.

FIG. 1B show a communication system 112 that continually reallocates resources based on BSM. In FIG. 1B, communication system 112 determines burst sizes Bs and the rates Ts at which bits are received at channels 114-1 and 114-2, and uses the Ts and Bs for channels 114-1 and 114-2 to set a burst size metric (BSM) 118-1 and a BSM 118-2 (collectively BSMs 118), respectively. The BSM may track the significance of bursts to system 112.

In contrast to system 102, system 112 dynamically updates BSMs 118 based on the B and T. Furthermore, system 112 may continuously resize allocated resources R-1 120-1 and R-2 120-2 (e.g., clock cycles allotted for processing data (e.g., frames, packets, etc.) arriving in channels 114-1 and 114-2, buffer memories for channels 114-1 and 114-2 to temporarily hold incoming traffic, etc.) based on need or system performance. In addition, based on the B and T, system 112 may set alarms, enable or disable data processing for a given channel, etc.

Communication systems 102 and 112 in FIGS. 1A and 1B are exemplary. In an actual implementation, a system may include additional or fewer channels than those illustrated in FIGS. 1A and 1B. Furthermore, in one implementation, the system may monitor/obtain parameters other than the B and T and may perform other actions (e.g., drop frames, penalize/credit a user, disable a channel, etc.).

Figure 2:
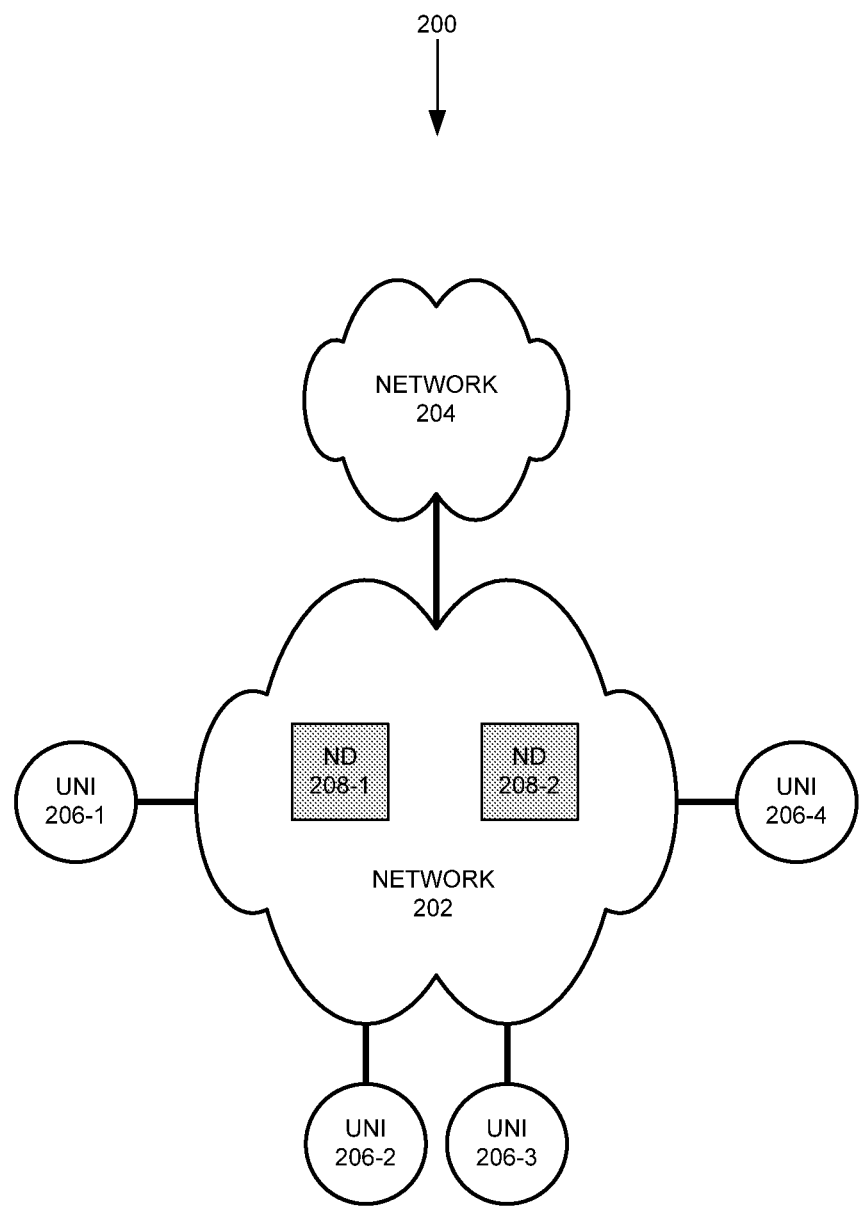
FIG. 2 shows an exemplary network in which systems of FIGS. 1A and 1B may be implemented.

FIG. 2 shows an exemplary network 200 in which communication system 102 or 112 may be implemented. As shown, network 200 may include service provider network 202, network 204, user to network interfaces (UNIs) 206-1 through 206-4 (collectively herein referred to as UNIs 206 and individually as UNI 206), and network devices (NDs) 208-1 and 208-2 (collectively network devices 208 and individually network device 208). Depending on the implementation, network 200 may include may include additional, fewer, or different networks and network elements than those illustrated in FIG. 2. For example, in one implementation, network 200 may include metro Ethernet networks (MENs), network-to-network interfaces (NNIs) between the MENs, Synchronous Optical Network (SONET) network rings that are interconnected by long-haul optical lines, additional network elements (e.g., routers, switches, etc.), servers, client devices, wireless devices, etc.

Service provider network 202 may include optical fibers/non-optical lines and central office hubs that are interconnected by the fibers/lines. The optical fibers and the lines may form the backbone of service provider network 202. The central office hubs may provide telecommunication services to subscribers, such as telephone service, access to the Internet, cable television programs, etc., via line terminals. Each central office hub may house telecommunication equipment, including switches (e.g., Ethernet switches), optical line terminals, etc.

Network 204 may include a wired or wireless network via which devices communicate (e.g., a fiber-optic network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks).

Each UNI 206 may include a physical interface that is a demarcation point between a subscriber and a service provider. UNI 206 is typically provided by a service provider/carrier and may be capable of supporting one or more bandwidths, such as 10 Mbps, 100 Mbps, 1 Gbps, 10 Gbps, etc.

In FIG. 2, one UNI (e.g., UNI 206-1) may form an Ethernet virtual circuit (EVC) over network 202 with another UNI (e.g., UNI 206-2). UNIs that form an EVC may communicate with one another over the EVC. UNIs may form different types of EVCs, such as a point-to-point EVC, multipoint to multipoint EVC, point to multipoint EVC, etc. Multiple EVCs may be bundled within a UNI or multiplexed on the same UNI. Each EVC may carry a single Class of Service (CoS) channel, or alternatively, carry multiple channels of different CoSs (e.g., Ethernet Virtual Private Line (EVPL)-Real Time (RT), EVPL-basic (B), EVPL-Priority Data (PD), etc.).

Each network device 208 may include switches, routers, and/or other network devices. Some of these devices may provide support for Ethernet services (e.g., Cisco 6509 Switch).

Figure 3A:
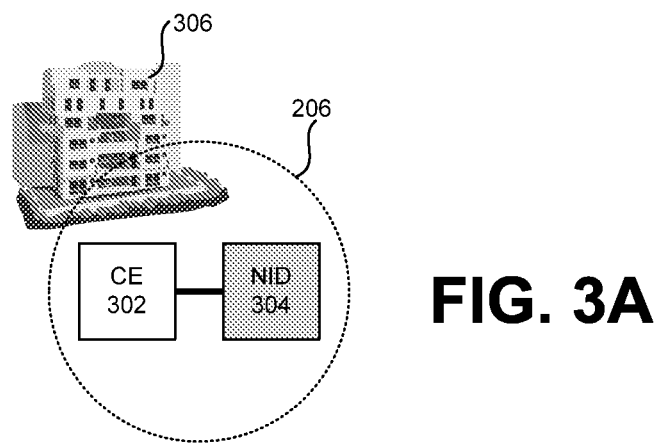
FIG. 3A is a diagram of exemplary components of a user-to-network interface (UNI) of FIG. 2.

FIG. 3A is a diagram of exemplary components of UNI 206. As shown, UNI 206 may include a customer edge (CE) device 302 and a network interface device (NID) 304. Depending on the implementation, UNI 206 may include fewer, additional, or different devices than those illustrated in FIG. 3A. For example, in one implementation, UNI 206 may include only NID 304. In another implementation, UNI 206 may include CE device 302, NID 304, and an Ethernet switch.

CE device 302 may provide an entry/exit to/from customer network, and typically may be located in customer premises 306 (e.g., office, apartment, house, etc.). Examples of CE device 302 include a router, modem, firewall, etc. In FIG. 3A, CE device 302 may provide the customer-side functions of UNI (UNI-C).

NID 304 may include a device that provides a service provider/carrier's functions of UNI (UNI-N). In a different implementation, NID 304 may provide for other functions that are associated with a UNI. Examples of NID 304 include telephone network interface (TNI), optical network terminal (ONT), wiring terminals, etc.

Figure 3B:
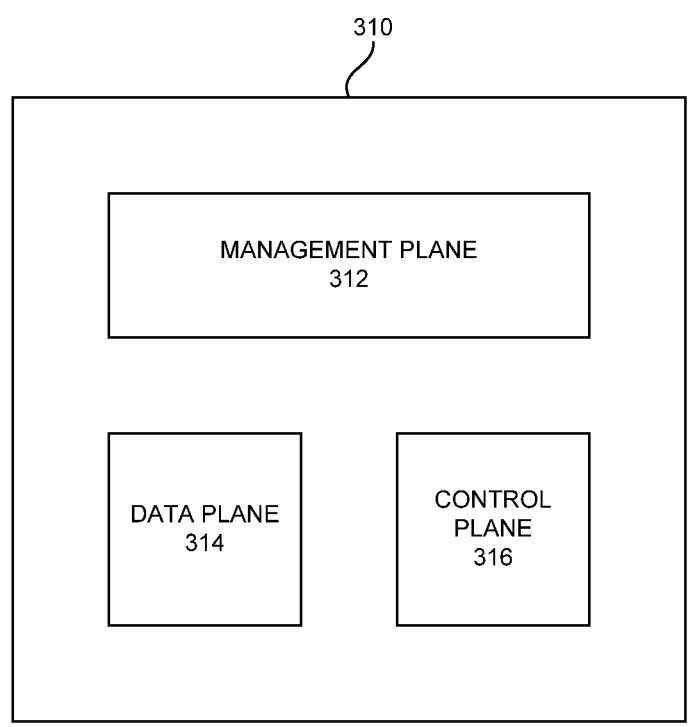
FIG. 3B is a block diagram of exemplary functional components of a network element of FIG. 2.

FIG. 3B is a block diagram of exemplary functional components of a network element of FIG. 2. Network element 310 may represent UNI 206, network device 208, a device in network 202 or 204, a device or component in UNI 206 or in network device 208. As shown in FIG. 3B, network element 310 may include a management plane component 312, data place component 314, and control plane component 316. Depending on the implementation, network element 310 may include additional, fewer, or different components than those illustrated in FIG. 3B. For example, in some implementations, network element 310 may not include management plane component 312 or control plane component 316.

Management plane component 312 may include hardware and/or software components for supporting operation, administration, and management functions. For example, management plane component 312 may support discovery, remote failure detection/indication, remote loopback testing, alarm generation or processing, link performance monitoring, management information base (MIB) data retrieval, etc.

Data plane component 314 may include hardware/software components for processing data. In some implementations, such as routers, data plane component 314 may forward data to their destinations in network 200. Examples of data plane component 314 may include an Ethernet card, line card of a router, packet processing engine on the line card, forwarding information base (FIB), etc.

Control plane component 316 may include hardware/software components for exchanging signaling information, such as routing information, traffic engineering information, etc. In one implementation, control plane component 315 may negotiate a CBS with one or more other network elements.

Figure 4:
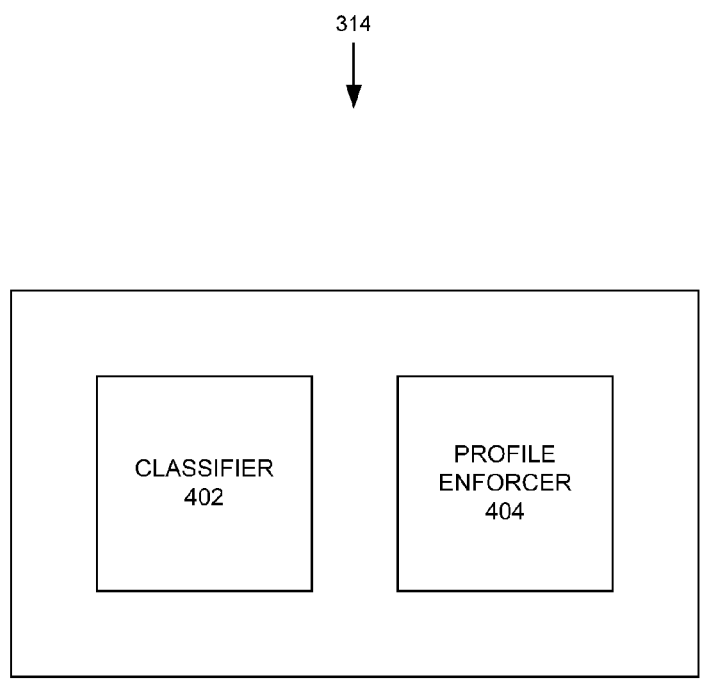
FIG. 4 is a block diagram of exemplary functional components of the data plane component of FIG. 3B.

FIG. 4 is a block diagram of exemplary functional components of data plane component 314. As shown, data plane component 314 may include a classifier 402 and profile enforcer 404. Depending on the implementation, data plane component 314 may include additional, fewer, or different components than those illustrated in FIG. 4. Furthermore, although data plane component 314 may include other components, for simplicity, they are not illustrated in FIG. 4. For example, in one implementation, data plane component 314 may include an optical module for line termination, packet processing engine, Media Access Control (MAC) address processor, etc.

Classifier 402 may classify each incoming data (e.g., packet, Ethernet service frame, etc.) and determine to which level of service (e.g., CoS), quality of service (QoS), etc.) the data belongs (e.g., based on CoS Identifier (ID)). Profile enforcer 404 may apply/police a performance profile to/of a channel. For example, in one implementation, profile enforcer 404 may take the form of a policer that processes real time traffic based on bandwidth profiles. As used herein, "real time traffic" may refer to emulated time division multiplexing (TDM) dedicated circuit traffic. "Real time service" may refer to a service emulating the behavior of TDM dedicated circuits.

Policing a channel based on a bandwidth profile may include metering each ingress flow; marking data as green, yellow, or red; discarding red data or preventing the red data from entering network 200; admitting green data into network 200; etc.

In some implementations, data plane component 314 may include a resource manager (e.g., process manager, a buffer manager that allocates a CBS buffer for handling traffic burst for a channel (e.g., EVC), etc.). In one implementation, the resource manager may uniformly adjust amounts of allocated resources (e.g., processing cycles, CBS buffer spaces, etc.) for all channels of a given bundle (e.g., EVCs of a UNI) in accordance with a CBS. This may result in increasing the overall allocated resources for the channels. In another implementation, the resource manager may reapportion the resource for specific channels (e.g., increase the number of processing cycles for one channel and decrease the number of processing cycles for another channel, increase a CBS buffer space for one channel and decrease CBS buffer space(s) for one or more other channels) based on measured burst sizes Bs, without increasing the overall allocated resource for the channels.

During its operation, on average, data plane component 314 receives/sends data, via a channel, at the rate equal to the CIR. However, in a given instance, the data may present themselves to profile enforcer 404 at a rate higher than the CIR, potentially up to the line rate of the network element (e.g., UNI). If the instantaneous arrival/transmission rate T for the channel results in received data requiring more than the allocated resource (e.g., data requiring more than the current CBS buffer space), profile enforcer 404 may drop the received data after marking the received data as red. In a sense, the CBS effectively limits the amount of time during which the arrival rate of the data can exceed the CIR. That is, CBS may limit the length of a burst.

In the context of CBS buffer space, in some implementations, real time services based on CIR/CBS are partly designed to provide a minimum delay and delay fluctuations in processing data. Accordingly, a CBS buffer may be set to a relatively small value. Increasing this space may impact the performance of the network device, as increasing the CBS buffer space increases the delay (e.g., amount of time that data may wait in the CBS buffer) and delay fluctuations associated with the data.

In some instances, increasing the CBS buffer may be preferable to the loss of performance due to dropped data (e.g., frames, packets, etc.). However, when a network element allows the CBS buffer to increase, such as, for the real time service, because the memory on the network element is limited, the increase may affect other services that require a large CBS/EBS space.

These types of performance-trade off issues arise not only for CBS buffers, but also for other types of resources. To avoid such or similar issues, in some implementations, a network element may reapportion or reallocate resources without increasing the overall allocated amount. For example, the network element increase an allocated resource of one type (e.g., CBS buffer space) for a specific channel (e.g., EVC whose burst is high) while decreasing allocated resources of the same type for other channels (e.g., channels associated with little resource utilization (e.g., channels with relatively empty CBS buffer spaces)), such that the amount of overall allocated resources stays constant.

Figure 5A:
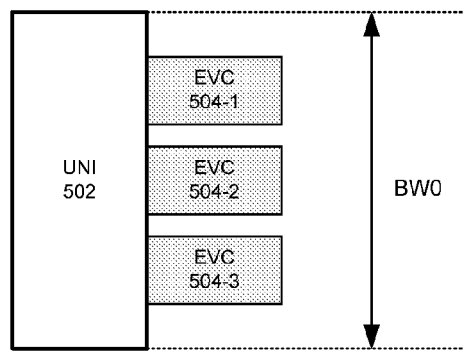
FIG. 5A illustrates an exemplary per UNI bandwidth profile.
Figure 5B:
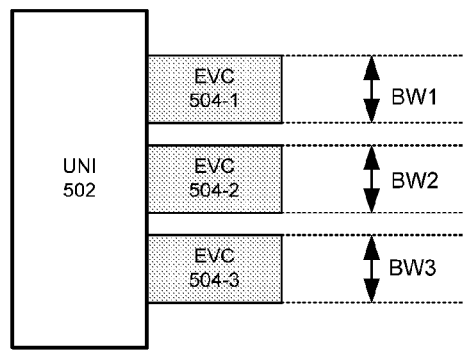
FIG. 5B illustrates an exemplary per UNI-Ethernet virtual circuit (EVC) bandwidth profile.
Figure 5C:
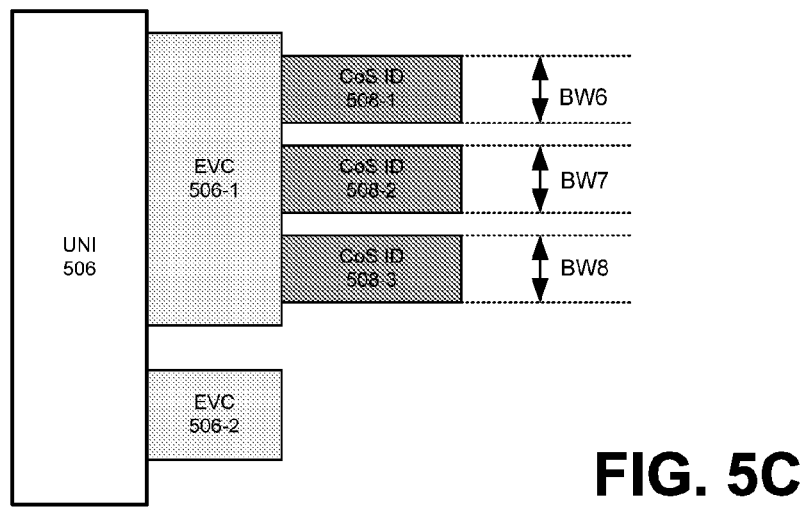
FIG. 5C illustrates an exemplary per UNI-EVC-Class of Service (CoS) bandwidth profile.

FIGS. 5A through 5C illustrate different types of bandwidth profiles that profile enforcer 404 may apply to incoming data. For FIGS. 5A through 5C, for simplicity, it is assumed that the data is in the form of Ethernet frames.

FIG. 5A illustrates an exemplary per UNI or per port bandwidth profile. As shown in FIG. 5A, in per UNI/port bandwidth profile, a bandwidth BW0 is specified for a UNI 502. As described above, although UNI 502 may include EVC 504-1, EVC 504-2, EVC 504-3, or additional EVCs with other UNIs, the profile does not specify or constrain relative bandwidths of EVC 504-1, EVC 504-2, EVC 504-3, etc.

FIG. 5B illustrates an exemplary per UNI-EVC (or per port-VLAN) bandwidth profile. As shown in FIG. 5B, in per UNI-EVC bandwidth profile, a bandwidth is specified for each EVC in a UNI. More specifically, FIG. 5B shows a bandwidth profile that specifies BW1, BW2, and BW3 for EVC 504-1, EVC 504-2, and EVC 504-3 of UNI 502.

FIG. 5C illustrates an exemplary per UNI-EVC-CoS (or per port-VLAN-CoS) bandwidth profile. As shown in FIG. 5C, in per UNI-EVC-CoS bandwidth profile, a bandwidth is specified for frames of different CoS in an EVC in a UNI. More specifically, FIG. 5C shows bandwidths BW6, BW7, and BW8 for CoS ID 508-1, CoS ID 508-2, and CoS ID 508-3, respectively. As further shown, EVC 506-1 carries frames with CoS IDs 508-1, 508-2, and 508-3, respectively. Also as shown, UNI 506 includes EVC 506-1 and EVC 506-2.

Figure 6:
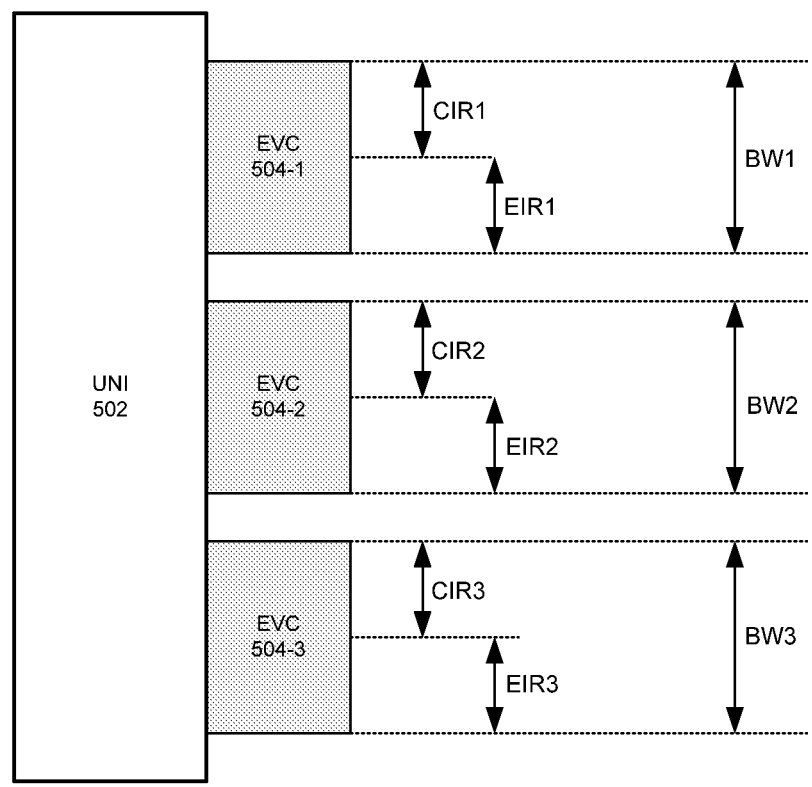
FIG. 6 illustrates a relationship between the parameters of a bandwidth profile.

FIG. 6 illustrates the relationship between parameters of a bandwidth profile. More specifically, FIG. 6 re-illustrates EVCs of FIG. 5B. FIG. 6 also shows, for each EVC, two parameters of the bandwidth profile, a CIR and Excess Information Rate (EIR). As discussed above, CIR is an information rate that is contracted between two or more network elements. EIR is an information rate that is in excess of the corresponding CIR. When incoming frames exceed a CIR but is below the corresponding EIR, the system receiving the frames may process the traffic in accordance with its own rules/policies, rather than dropping them. In FIG. 6, given a channel (e.g., EVC), CIR and EIR are related to one another by:

$$\text{Bandwidth of a channel} = CIR + EIR \qquad (2)$$

For example, in FIG. 6, BW1=CIR1+EIR1, BW2=CIR2+EIR2, and BW3=CIR3+EIR3.

In addition to a specified channel bandwidth BW, a CIR, and an EIR, a bandwidth profile may include other parameters, such as a CBS and Excess Burst Size (EBS). As discussed above, CBS identifies a burst size (e.g., in bits) that a network element has contracted with other network elements. EBS is the number of bytes that is in excess of the corresponding CBS.

FIGS. 5A through 5C and FIG. 6 illustrate different types of bandwidth profiles and the relationship between the CIR, CBS, EIR, and EBS in the context of Ethernet and EVCs. However, depending on the implementation, bandwidth profiles, CIR, CBS, EIR, and EBS may be provided for other types of channels other than EVCs.

Figure 7:
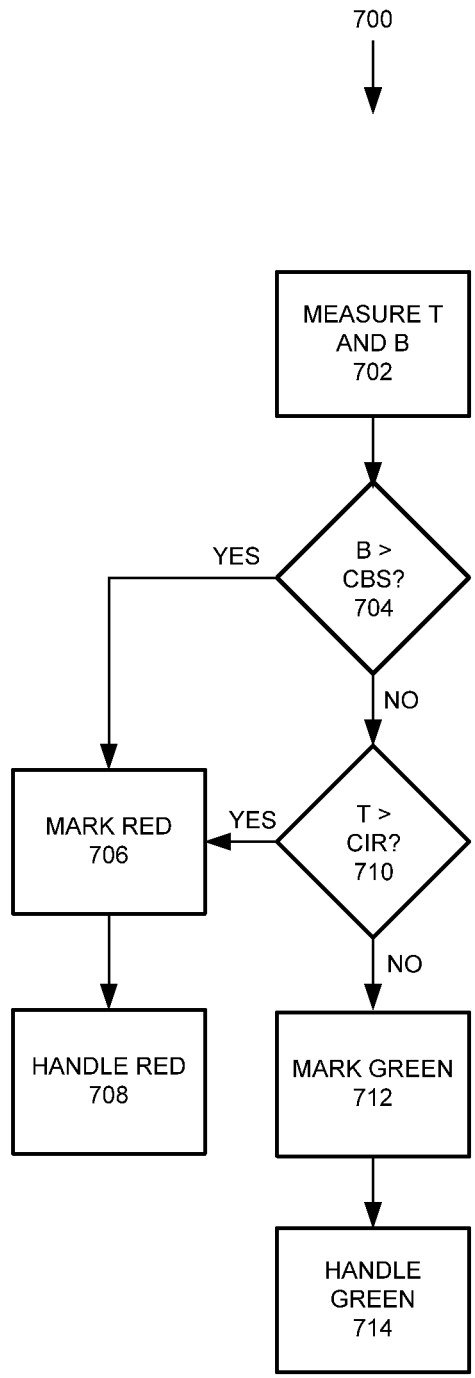
FIG. 7 is a flow diagram of an exemplary process, associated with the profile enforcer of FIG. 4, for applying the committed information rate (CIR) and committed burst size (CBS) of a bandwidth profile to a channel.

FIG. 7 is a flow diagram of an exemplary process 700 associated with profile enforcer 404 for applying the CIR and CBS of a bandwidth profile to a channel. In contrast to a process 800 shown in FIG. 8, process 700 does not use the burst size metric BSM. For process 700, assume that a network element (e.g., network device 208-1, UNI 206, etc.) has negotiated a bandwidth profile with another network element. In addition, assume that data is arriving at the network element and that profile enforcer 404 in data plane component 316 of the network element is processing the data. Furthermore, assume that data is arriving at the network element at the rate T.

Process 700 may begin with the network element monitoring incoming data over a monitoring interval (MI) (block 702). During the MI, the network element may determine the arrival rate T at which bits are received and a burst size B (number of bits received during the MI).

The network element may determine whether the number of bits B received over the monitoring interval MI exceeds a CBS of the bandwidth profile (block 704). If the number of bits B is greater than the CBS (block 704: yes), the network element may mark the currently received data as being red (block 706). Marking the data may include indicating, in a memory, that the data is one of three possible types: red, green, and yellow. Furthermore, the network element may process the red data in accordance with its internal rules/policy (block 708). Processing the red data may include, for example, dropping a packet or a frame, collecting statistics, inspecting packets in the frame, etc.

If the burst size B is not greater than the CBS (block 704: no), the network element may determine whether a measured arrival rate of information T is greater than the CIR of the bandwidth profile (block 710). If the rate T is greater than the CIR (block 710: yes), the network element may proceed to block 706, to mark the data red, and then to block 708 to handle the red data. If the rate T is not greater than the CIR (block 710: no), the network element may mark the data green (block 712) and handle the green data (block 714). Processing the green data may include, for example, inspecting a data header, placing the data in a CBS buffer, etc.

In a different implementation, the network element may apply EIR and EBS, as well as CIR and CBS, of a bandwidth profile to a channel. The purpose of applying EIS/EBS is to allow a network element to send traffic beyond the contractual rate if network traffic conditions permit. However, there are no contractual guarantees for this excess traffic. In process 700, if the information rate T is greater than a CIR but less than EIR, and the burst size B does not exceed EBS, then the current data being processed is marked as yellow. Unlike green data, for which there are contractual guarantees, yellow data may be dropped by the network device under certain conditions (e.g., network congestion).

Figure 8:
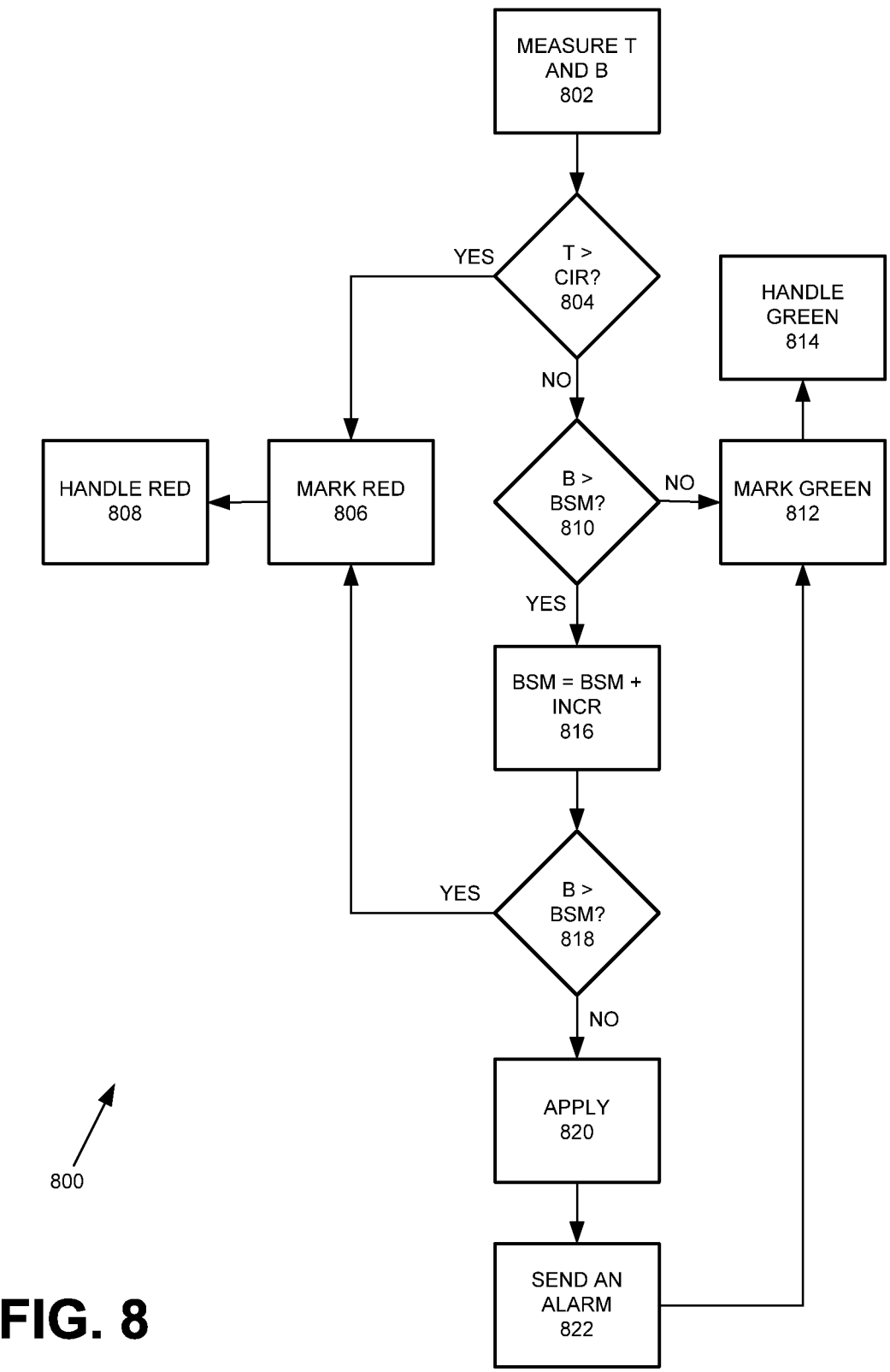
FIG. 8 is a flow diagram of an exemplary process, associated with the profile enforcer of FIG. 4, for applying burst size metric (BSM) to a channel.

FIG. 8 is a flow diagram of process 800 for applying the BSM to a channel. Process 800 differs from process 700, in that process 800 uses the BSM. In addition, in process 800, T and B may exceed the CIR and CBS, respectively, and the excess traffic may be marked green, rather than being dropped or marked red. It is also different from some processes that use the EIR and EBS. In such processes, the excess traffic may be marked yellow. Yellow traffic/data may be dropped when the network traffic condition changes (e.g., when congestion occurs).

For process 800, assume that a network element has negotiated a bandwidth profile with another network element. In addition, assume that data is arriving at the network element and that profile enforcer 404 in data plane component 316 of the network element is processing the data. Furthermore, assume that data is arriving at the network element at the rate T. Process 800 may begin with the network element monitoring data (e.g., Ethernet frame, IP packet, etc.) that is received during the MI (block 802). During the MI, the network element may monitor the rate T at which bits are received and the burst size B.

The network element may determine if the rate T is greater than the CIR (block 804). If the T is greater than the CIR (block 804: yes), the network element may mark the data (e.g., frame, packet, etc.) as being red (block 806), and then proceed to handle the red data (block 808). As in process 700 and process 800, handling the red data may entail processing the red data in accordance with rules and/or policies at the network element.

If the T is not greater than the CIR (block 804: no), the network element may compare the B to a burst size metric (BSM) (block 810). Initially, the BSM may have been set to the value of the CBS. If the B is not greater than the BSM (block 810: no), the network element may mark the data as being green (block 812). In addition, the network element may process the green data in accordance with its rules/policy (block 814). For example, the network element may place the data (e.g., an Ethernet frame) in a CBS buffer, to be forwarded to a MAC address in network 200.

If the B is greater than the BSM (block 810: yes), the network element may determine a new value of the BSM, by adding the current value of the BSM to a predetermined increment INCR (block 816). The value of the INCR may be implementation dependent. For example, assume that, in one implementation, the network element uses the BSM to determine the size of the CBS buffer. In such an implementation, the INCR may be set, to the following:

MIN(the maximum buffer space for the channel—the value of CBS, available buffer space).

This may place a limit on the amount of memory by which the CBS buffer can be expanded. In another implementation, the INCR may have been set to a constant that represents a fixed number of processing cycles.

The network element may determine whether the B is greater than the BSM (block 818). If the B is greater than the BSM (block 818: yes), the network element may proceed to block 806, to mark the frame red. Otherwise (block 818: no), the network element may proceed to block 820.

The network element may apply the value of the BSM to different components within the network element (block 820). For example, in the implementation where the network element uses the BSM to determine the CBS buffer size, the network element may increase the CBS buffer by the increment INCR. To keep the combined, overall CBS buffer size for all channels for a given interface constant, however, the CBS buffer size for other channels for the interface may be also decreased by INCR. In another implementation, the network element may increase the amount of processor cycles allocated for processing the incoming traffic. Depending on the implementation, the network element may apply the value of the BSM in different ways.

The network element may send an alarm (e.g., via a component in its management plane 312) (block 822). The alarm may notify a user or operator that the B has exceeded the CBS. Thereafter, the network element may proceed to block 812, to mark the data green and then to process the green data (blocks 812 and 814).

In some implementations, the network element may also keep a violation counter that is incremented after block 810. In such implementations, when the B exceeds the CBS too frequently (e.g., see block 810), the network element may disallow the BSM from being further modified and affecting other channels (e.g., an expansion of the CBS buffer for one EVC may affect CBS buffer spaces for other EVCs).

Furthermore, in some implementations, when the BSM is first incremented after being set to the CBS (see block 816), the network element also set a trigger condition resetting the BSM to the CBS. For example, the network element may set the time (e.g., set a timer) at which the BSM may be reset to the CBS. Alternatively, the network element may reset the BSM when the violation counter exceeds a particular threshold.

Figure 9:
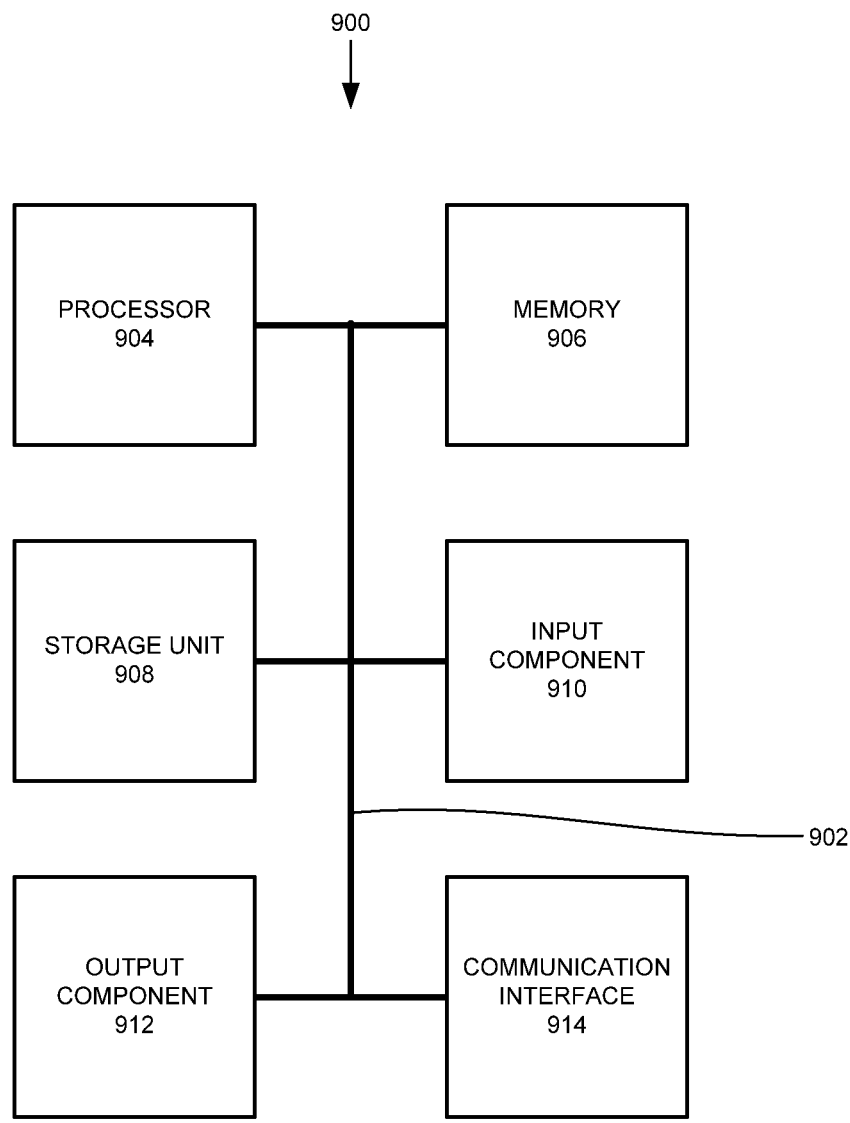
FIG. 9 is a block diagram of exemplary components of a network device of FIG. 2.

FIG. 9 is a block diagram of an exemplary network device 900. Network device 900 may correspond to one or more of devices on which network elements in FIG. 2 may be implemented. Referring to FIG. 9, network device 900 may include bus 902, processor 904, memory 906, storage unit 908, input component 910, output component 912, and communication interface 914. Bus 902 may include a path that permits communication among the elements of network device 900.

Processor 904 may include a processor, a microprocessor, an Application Specific Integrated Circuit (ASIC), a Field Programmable Gate Array (FPGA), and/or other processing logic (e.g., embedded devices) capable of controlling network device 900, processing data (e.g., incoming frames, etc.). Memory 906 may include static memory, such as read only memory (ROM), and/or dynamic memory, such as random access memory (RAM) and content addressable memory (CAM), or onboard cache, for storing data and machine-readable instructions (e.g., programs, scripts, etc.).

Storage unit 908 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" or "computer readable medium" may refer to a memory and/or storage device.

Input component 910 may permit a user to input information to network device 900. Input component 910 may include, for example, a keyboard, a keypad, a mouse, a pen, a microphone, a touch screen, voice recognition and/or biometric mechanisms, etc. Output component 912 may include a mechanism that outputs information to the user. Output component 912 may include, for example, a display, a printer, a speaker, etc. In some implementations, because network device 900 may operate as a server device, network device 900 may include a minimal number of input components 910 and output components 912 (e.g., a keyboard and/or a console), to minimize cost and to increase robustness.

Communication interface 914 may include a transceiver (e.g., a transmitter or receiver) for network device 900 to communicate with other devices and/or systems. For example, via communication interface 914, network device 900 may communicate over a network, such as the Internet, an intranet, a terrestrial wireless network (e.g., a WLAN, WiFi, WiMax, etc.), a satellite-based network, optical network, etc. Communication interface 914 may also include a modem, an Ethernet interface to a LAN, and/or another interface.

In the description above, a network element may monitor the network traffic burst size B and information rate T. The network element may use BSMs to incoming data as red or green and to process the marked data. In addition, depending on the implementation, the network element may reallocate resources (e.g., processing time per channel, buffer, etc.) and/or improve its processing performance based on the B and T.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to the process illustrated in FIG. 8, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  receiving, by a network device, first data at a channel over a network, the network device having an interface for the channel and other channels;
  measuring, over a particular time interval, a burst size and an information arrival rate at the channel based on received data;
  determining whether the burst size is greater than a first burst size metric, the first burst size metric being initialized to a committed burst size of the channel;
  when the burst size is determined to be greater than the first burst size metric, setting a second burst size metric to a sum of the first burst size metric and an increment value;
  determining whether the burst size is greater than the second burst size metric after the second burst size metric is set to the sum of the first burst size metric and the increment value;
  increasing a first amount, of a resource allocated to the channel of the network device, by an increment corresponding to the second burst size metric after determining that the burst size is not greater than the second burst size metric; and
  decreasing a second amount, of the resource allocated to the other channels, by the increment, when the first amount of the resource is increased by the increment.

2. The method of claim 1, further comprising:
  marking the first data with a first feature when the burst size is not greater than the second burst size metric; and
  marking the first data with a second feature when the burst size is greater than the second burst size metric.

3. The method of claim 2, further comprising:
  forwarding the first data marked with the first feature toward its destination in the network, wherein the first feature includes a green color.

4. The method of claim 2, wherein the first data includes:
  an Ethernet service frame; or
  a Internet Protocol (IP) packet.

5. The method of claim 2, further comprising:
  discarding the first data marked with the second feature, wherein the second feature includes a red color.

6. The method of claim 1, further comprising:
  negotiating a committed buffer size by a control plane component on the network device.

7. The method of claim 1, further comprising, after determining that the burst size is not greater than the second burst size metric, at least one of:
  sending an alarm to a user or an operator to notify that the channel needs additional committed burst size buffer space;
  incrementing a violation counter, the violation counter being indicative of a number of times that the burst size exceeds a burst size metric; or
  setting a timer, for the network device, to resize a committed burst size buffer, for the channel, to its original size.

8. The method of claim 1, further comprising, after determining that the burst size is not greater than the second burst size metric:
  increasing a first committed burst size buffer that is associated with the channel by an amount; and
  decreasing total committed burst size buffers of one or more other channels by the amount.

9. The method of claim 8, wherein increasing the first committed burst size buffer includes:
  limiting the amount to a threshold.

10. The method of claim 1, wherein the increment value includes a minimum of an available buffer space and a difference between a maximum buffer space for the channel and the committed burst size.

11. The method of claim 1, wherein the channel includes an Ethernet virtual circuit.

12. A network device comprising:
  a data plane component to:
    receive first data at a channel over a network;
    determine, over a particular time interval, a burst size and information arrival rate at the channel based on received data;
    determine whether the burst size is greater than a first burst size metric, the first burst size metric being initialized to a committed burst size for the channel;

when the burst size is determined to be greater than the first burst size metric, set a second burst size metric to a sum of the first burst size metric and an increment value;

determine whether the burst size is greater than the second burst size metric after the second burst size metric is set to the sum of the first burst size metric and the increment value; and resize temporary amounts of allocated resources of the network device based on the second burst size metric after determining that the burst size is not greater than the second burst size metric.

13. The network device of claim 12, wherein the network device comprises:
    a router;
    a switch; or
    an Ethernet switch.

14. The network device of claim 12, wherein the first data includes:
    a packet; or
    an Ethernet service frame.

15. The network device of claim 14, wherein the Ethernet service frame includes:
    a Ethernet service frame.

16. The network device of claim 12, wherein, when the burst size is not greater than the second burst size metric, the data plane component is further configured to at least one of:
    send an alarm to a user or an operator to notify that the channel needs additional committed burst size buffer space;
    increment a violation counter, the violation counter being indicative of a number of times that the burst size exceeds a burst size metric; or
    setting a timer, for the device, to resize a committed burst size buffer, for the channel, to its original size.

17. The device of claim 12, wherein when resizing the temporary amounts of allocated resources of the network device based on the second burst size metric, the data plane component is further configured to:

increase a first committed burst size buffer that is associated with the channel by an amount; and
decrease total committed burst size buffers of one or more other channels by the amount.

18. The method of claim 17, wherein the data plane component is further configured to limit increasing the first committed burst size buffer.

19. The method of claim 12, wherein the data plane component is further configured to:
    mark the first data green when the burst size is not greater than the second burst size metric; and
    mark the first data red when the burst size is greater than the second burst size metric.

20. A communication device comprising:
    an Ethernet card to:
        receive a first Ethernet service frame at an Ethernet virtual circuit of a user-to-network interface;
        measure a burst size and information arrival rate at the Ethernet virtual circuit based on one or more received Ethernet frames;
        determine whether the burst size is greater than a first burst size metric, the first burst size metric being set to a committed burst size of the Ethernet virtual circuit;
        when the burst size is determined to be greater than the first burst size metric, set a second burst size metric to a sum of the first burst size metric and an increment value;
        determine whether the burst size is greater than the second burst size metric after the second burst size metric is set to the sum of the first burst size metric and the increment value;
        resize committed burst size buffer space for the Ethernet virtual circuit based on the second burst size metric and set a timer after determining that the burst size is not greater than the second burst size metric; and
        return the second burst size metric to its original size when the timer expires.

* * * * *